United States Patent [19]

Barda et al.

[11] 4,352,909
[45] Oct. 5, 1982

[54] PROCESS FOR THE BROMINATION OF POLYSTYRENES

[75] Inventors: Henry J. Barda, East Brunswick, N.J.; Sandra L. Gray, Reynoldsburg, Ohio

[73] Assignee: Ferro Corporation, Cleveland, Ohio

[21] Appl. No.: 179,913

[22] Filed: Aug. 20, 1980

[51] Int. Cl.³ ............................. C08F 8/20; C08F 8/22
[52] U.S. Cl. ...................................... 525/157; 525/155; 525/156
[58] Field of Search ........................ 525/355, 356, 357

[56] References Cited
U.S. PATENT DOCUMENTS 4,143,221  3/1979  Naarmann et al. ................. 525/357
4,200,703  4/1980  Diebel et al. ........................ 525/357

FOREIGN PATENT DOCUMENTS 2800012  7/1979  Fed. Rep. of Germany .
2800013  7/1979  Fed. Rep. of Germany .

Primary Examiner—William F. Hamrock
Attorney, Agent, or Firm—Milton L. Simmons

[57] ABSTRACT

There is disclosed a process for producing a trihalogenated polystyrene flame retardant for synthetic resins, whereby high molecular weight polystyrene is reacted with bromine chloride in a chlorinated hydrocarbon solvent, under substantially anhydrous conditions, in the presence of a catalytic amount of a Lewis acid.

6 Claims, No Drawings

PROCESS FOR THE BROMINATION OF POLYSTYRENES

RELATED APPLICATIONS

United States patent application Ser. No. 874,765, filed Feb. 3, 1978, in the name of Henry J. Barda, now U.S. Pat. No. 4,223,169, issued Sept. 16, 1980, which application was a continuation-in-part of application Ser. No. 664,628, filed Mar. 8, 1976, and now abandoned, describes a process for the bromination of certain bis(phenoxy)alkanes. In this process, a bis(phenoxy)alkane that has 2 or 3 carbons in its alkane moiety is reacted with bromine chloride in the presence of a Lewis acid catalyst, to effect nuclear bromination. Complete or partial halogenation can be achieved, as desired.

The reaction is notable not only because complete halogenation, essentially bromination, can be achieved, but also because the yields are commercially acceptable, i.e., there is little cleavage or other degradation of the substrate.

Both of these applications are incorporated herein by reference.

INTRODUCTION

This invention is concerned primarily with a process for the production of nuclear brominated polystyrenes. Such products are useful as additives for several synthetic resins as flame retardants. The invention also relates to the products obtained by the process and to flame-retarded compositions containing them.

BACKGROUND

The use of polybrominated polystyrenes as flame retardant additives for polyolefin-based molding materials is described in U.S. Pat. No. 3,474,067. That patent describes combinations of molding materials based on polyethylene and polypropylene with several different nuclear-brominated polystyrenes together with synergists such as antimony trioxide. The use of poly-(tribromostyrene) was particularly emphasized, as in Table 1 of the patent. However, the patent does not disclose the molecular weight of the brominated polystyrene, nor how it was produced.

U.S. Pat. No. 3,973,354 describes a flame-resistant thermoplastic glass-fiber reinforced polyester molding composition, containing a saturated polyester, a synergist, and from 3% to 30% by weight of the composition of poly(2,4,6-tribromostyrene). The patent reported that the poly(2,4,6-tribromostyrene) was a commercially available product with a density of 2.3 grams/cm$^3$ and a bromine content of 69%. The process for making the product is not described in this patent.

The direct nuclear halogenation of polystyrene in solution, in the presence of iron chloride or aluminum chloride, with elemental chlorine, is described in British Pat. No. 364,873.

The direct bromination of polystyrene is described in U.S. Pat. No. 3,050,476. A suspension of polystyrene particles is heated in the presence of bromine, to cause bromine to combine chemically with the polymer particles. Bromine is added to a very low level of bromination.

U.S. Pat. No. 3,845,146, describes the bromination of aromatic compounds such as lower alkyl benzenes, utilizing bromine chloride as the brominating agent, with a catalyst such as aluminum chloride. The reaction is conducted in a closed reaction vessel under autogenous pressure, often in the range from about 50 psig to about 100 psig.

Cubbon and Smith describe the synthesis and polymerization of tribromostyrene in an article in Polymer, 10, 479–487 (1969). Tribromostyrene is prepared in a multiple step reaction, by first effecting the addition of hydrogen bromide to the double bond of styrene to produce 2-bromoethylbenzene, then reacting that material with elemental bromine in the presence of iron chloride, to introduce bromine into the nucleus. Hydrogen bromide is then removed, to re-introduce the double bond, by reaction with potassium ethoxide, at about 30° C. The product was identified through its nuclear magnetic resonance spectrum as 2,4,5-tribromostyrene. The rate of polymerization of this tribrominated styrene was observed in benzene solution at 30° C. Upon comparing its rate of polymerization with that of dibromostyrene, the conclusion was reached that the introduction of bromine atoms activates the vinyl group toward polymerization, with the tribromostyrene polymerizing at a more rapid rate than the dibromostyrene, which in turn polymerizes at a more rapid rate than styrene.

Other trihalo aromatic compounds are well known. For example, the six isomers of tribromotoluene were characterized by Cohen and Dutt in Journal of the Chemical Society, 105, 501–521 (1914). U.S. Pat. No. 2,483,753, describes trichlorostyrene, and a method for producing it is described in the Journal of General Chemistry USSR, 28, 3303–3306 (1958). U.S. Pat. No. 2,398,736 teaches that dichlorostyrene and dibromostyrene are equivalent to each other for copolymerization with styrene. Polytrichlorostyrenes are also described, along with processes for producing them, in U.S. Pat. Nos. 2,406,319 and 2,463,897.

In German Pat. No. 1,570,395, Example 3 purports to describe the production of poly-(2,4,6-tribromostyrene), and Example 4 purports to describe the production of, simply, poly-(tribromostyrene).

More recently several patents have issued that describe the production and fire retardant use of brominated polystyrene oligomers. These oligomers may be prepared by the action of elemental bromine on the hydrogenated polystyrene oligomer, as in the Naarmann et al. U.S. Pat. Nos. 4,074,033 and 4,143,221, where the catalyst used was aluminum chloride (a Lewis acid catalyst), or alternatively, by the polymerization of brominated styrene.

In Wurmb et al., U.S. Pat. No. 4,107,231, such brominated oligomers are described as useful in imparting flame retardant properties to linear polyesters. The degree of polymerization of the oligomer may be in the range from 3 to 20. The use of a tribrominated oligomer is mentioned.

In Theysohn et al., U.S. Pat. No. 4,137,212, similar brominated polystyrene oligomers, with a degree of polymerization of from 3 to 90, are disclosed as useful for flameproofing molded nylon compositions. The tribrominated oligomer is mentioned.

In Neuberg et al., U.S. Pat. No. 4,151,223, the brominated oligomer may have a degree of polymerization in the range from 3 to about 100, and is described as useful for imparting flame-retardant properties to fibers and filaments of linear thermoplastic polyesters. This patent points out that the halogenated oligomeric styrene may be either chlorinated or brominated, and the degree of halogenation may run the complete spectrum.

BRIEF DESCRIPTION OF THE INVENTION

The present process is one for the production of brominated styrene oligomers and polystyrenes, preferably what are essentially tribrominated polystyrenes.

One preferred embodiment of the process can be summarized as consisting of:

1. dissolving polystyrene having a molecular weight of at least 20,000 in a solvent, preferably a chlorinated aliphatic hydrocarbon, and
2. reacting the dissolved polystyrene with a stoichiometric excess of bromine chloride over that required for achieving the desired degree of bromination, such as for tribromination in a preferred process mode, in which case the excess would be over that required to achieve total tribromination, i.e., 70.3% Br, in the presence of up to about 15% by weight of the polystyrene of a Lewis acid catalyst, such as antimony trichloride, at about 20° C. to about 50° C.

For nominal trihalogenation, the reaction is carried out until the degree of halogenation approaches the trihalogenated stage. Ordinarily the product will contain a small amount of chlorine as well as bromine.

The dominant substitution pattern in the trihalogenated product is at the 2,4,5 positions, with significantly lesser amounts of other isomers including 2,3,5. There does not appear to be any 2,4,6 substitution. The very small percentage of chlorine is believed to be nuclear bound.

DETAILED DESCRIPTION OF THE INVENTION

One preferred embodiment of the process of the invention may be represented by the following equation, which represents, in part, one preferred idealized mode for the practice of the invention:

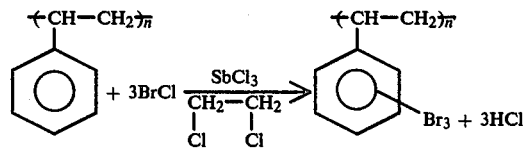

As the equation indicates, the reaction in this embodiment of the invention is generally conducted in the presence of a solvent, preferably a chlorinated hydrocarbon solvent. Bromine chloride is used as the brominating agent. The catalyst is preferably a metal salt halogenation catalyst, most preferably a chloride or bromide of antimony or aluminum. The reaction is carried out to introduce essentially three halogen atoms on each aromatic nucleus, predominantly bromine atoms. Hydrogen chloride is produced as a byproduct of the reaction.

While the invention can be employed, as indicated in the equation above, for the production of what is essentially tribrominated polystyrene, the process of the invention is of general utility for the production of brominated polystyrene products having any desired degree of bromination. The halogenated polystyrenes, and especially the brominated polystyrenes, have flame retardant properties.

Prior art bromination techniques, applied to styrene polymers or oligomers, are currently less practical and attractive than the present process. Products can be produced by the preferred process of the invention at any desired level of bromination with very good color characteristics, so that the highly brominated products are attractive fire retardant additives for the plastics industry. Products having a lower degree of bromination than essentially tribromination are also useful as inherently flame retardant materials.

The polystyrene reactant that is employed may be either an oligomer or a polymer. That is, the initial molecular weight of the polystyrene is preferably 20,000 or more, and if in the range from about 20,000 to about 50,000, brominated polystyrene oligomers can be produced of recognized value as fire retardant additives. Where the polystyrene reactant has a molecular weight of about 20,000, n in the equation above has a value of about 192. When the process is conducted so that the end product is essentially tribrominated, n' will have a value somewhere in the range from about 50 to a maximum of about 192, the decrease in molecular weight being believed to be attributable to scission. Generally, the molecular weight in such case will fall in the range from about 17,000 to about 30,000 or so.

The molecular weight of the polystyrene reactant is ordinarily determined by gel permeation chromatography, and is a weight average molecular weight. For practical reasons, the weight average molecular weight of the brominated product is ordinarily determined by light scattering.

When the polystyrene reactant has a molecular weight of about 50,000, the value of n in the above equation is about 481. The value of n' can be expected to fall in the range from about 125 to about 481. For an essentially tribrominated product, the molecular weight of the product generally will be in the range from about 42,500 to about 75,000.

When the molecular weight of the polystyrene reactant is about 100,000, the value of n in the above equation is about 962. For an essentially tribrominated product, the value of n' is in the range from about 250 to 962. Generally, the molecular weight of the essentially tribrominated product is in the range from about 85,000 to about 150,000.

In a preferred embodiment of the invention, the molecular weight of the polystyrene reactant is about 150,000; n in the above equation is about 1,442; and for an essentially tribrominated polystyrene product, the weight average molecular weight is often in the range from about 135,000 to about 235,000.

The polystyrene reactant may be a polystyrene that is halo-substituted or lower alkyl-substituted. It may also be a copolymer, such as a copolymer of styrene and alpha-methyl styrene. A homopolymer of alpha-methyl styrene could be used, but would be less desirable than polystyrene for producing flame retardant additives, since it is less thermally stable. Generally, the polystyrene reactant could also be a block copolymer of polystyrene and one or more polymers of the saturated hydrocarbyl type.

A general overall procedure for carrying out one preferred embodiment of the reaction involves the initial preparation of a solution of bromine chloride. This solution may be prepared by adding essentially equivalent molar amounts of bromine and chlorine to ethylene dichloride or other suitable solvent in a container, and cooling to a temperature within the range from about 0° C. to about 5° C. Preferably a slight excess amount of bromine over theory is employed. The chlorine is added as a gas by means of a sparger or equivalent technique. This solution can be stored until it is needed. Alternatively, commercial bromine chloride can be used, such as the Dow Chemical product.

In carrying out the invention, the polystyrene reactant may have any desired molecular weight, but preferably is 20,000 or above. The value of 20,000 is selected not because of any lack of operability of the process with a polystyrene reactant having a lower molecular weight, but rather, because when the reaction is carried on to such an extent as to introduce enough bromine as a nuclear substituent to amount to, on the average, at least one bromine atom per ring, some scission of the polymer chain apparently occurs.

For fire retardant additive purposes, a polystyrene reactant having a molecular weight of at least 20,000 is preferred for use for the production of an essentially tribrominated product. When the molecular weight of the polystyrene reactant is only about 20,000 or less, the brominated product, while useful, may have a sufficiently low molecular weight as to have less desirable properties.

Accordingly, to carry out the reaction of the invention in accordance with the more preferred embodiments thereof, the polystyrene reactant should be selected to have a molecular weight of about 100,000 or more, and preferably, 150,000 or higher. The polystyrene reactant is dissolved in ethylene dichloride, or other suitable solvent, in a reaction vessel that is equipped for mechanical agitation. The chilled bromine chloride solution is then added to the reactor gradually, over a period of time that generally amounts to several hours. The catalyst may be added to the polystyrene solution or to the bromine chloride solution. Antimony trichloride is a preferred catalyst.

During this addition, the temperature of the solution in the reactor is maintained within a controlled range, generally from 20° C. to 50° C. The reaction goes forward at lower temperatures but at a slower rate. It also goes forward at higher temperatures, but the color of the product may be dark. The reaction is exothermic, so that some cooling is usually employed. Where color of the product is an important consideration, as it often is, particularly with respect to a tribrominated polystyrene product, it is considered advisable to maintain the temperature of the reaction mixture within a very narrow range of from about 27° C. to about 33° C. When the bromine chloride addition is complete, the reaction mixture is continuously stirred for another period of time, sufficient to permit the reaction to go to completion.

After the reaction is considered to be complete, any excess bromine chloride is destroyed, as by the addition of an aqueous solution of an alkali or an alkali metal bisulfite. Agitation of the reaction mixture is then stopped, and phase separation occurs.

Product recovery can be accomplished by mixing the organic layer with non-solvent liquid, such as an alkanol, to precipitate the product. The preferred technique involves the use of methanol. In this technique, the methanol or other non-solvent liquid, that is miscible with the organic liquid in which the reaction product is dissolved, is maintained in a separate vessel at close to the boiling point. The contents of the reaction vessel are heated to about 80° C., and then slowly added to the heated methanol, as it is agitated. The brominated polymer precipitates in the form of fine particles, which can be recovered by filtration, and dried, as in a forced air oven at about 115° C.

An essentially tribrominated product is one where the bromine content closely approaches that of theoretical. The process of the invention is such, however, that when the brominating agent is bromine chloride, some nuclear chlorination always takes place in addition to nuclear bromination. Accordingly, generally, in such cases the bromine content of the product is in the range from about 67% by weight to about 69% by weight of the product, and the chlorine content is up to about 2% by weight of the product.

A typical tribrominated polystyrene product produced by the practice of the preferred process may be found, upon analysis, to contain about 67%–69% by weight of bromine, about 1% to 2% by weight of chlorine, and generally, from about 0.5% to 2% by weight of volatiles. If the yield of the reaction is calculated, based upon three bromine atoms being substituted on each aromatic ring nucleus, the process of the invention typically produces a yield of about 90% or higher.

Typical Gardner color characteristics, for an essentially tribrominated polystyrene product produced by the preferred process of the invention from a polystyrene reactant having a molecular weight of about 150,000, are as follows:

| L | 91–93 |
|---|---|
| a | 0.2 |
| b | 7–10 |

Generally a colorless tribrominated polystyrene product is preferred. Any color traces can be removed from the product by passing the brominated polystyrene solution through a bed of activated charcoal.

In practicing the preferred process, particularly on an industrial scale, many departures from the foregoing general process description above can be made, within the scope of the invention. For example, commercially available bromine chloride can be added directly to the reactor, in place of freshly prepared bromine chloride solution. When the bromine chloride is made up for use, the proportion of bromine to chlorine may be in a molecular ratio of from about 0.7 to 1 to about 1.3 to 1. Usually some excess of bromine chloride must be used, but the amount in excess depends upon the reaction conditions, such as, for example, the equipment available, the thoroughness of mixing, the reaction temperature, and the like. Thus, when the reaction is carried out on a laboratory scale, where some of the bromine chloride may volatilize, or where the mixing may not be very effective, or there are other similar conditions that generate inefficiency, about 30% excess bromine chloride may be required to obtain results comparable to those obtained in the more efficient pilot plant equipment, where a 7% to 15% excess or less is all that is needed.

As is common in many chemical processes, the process steps may appear to be far removed from each other but may affect each other. Thus, the excess amounts of bromine chloride mentioned are those that would be used where the precipitant for the brominated polystyrene product is an alkanol. The term "excess" refers to the amount over and above the stoichiometric amount required to produce a theoretical, desired brominated product, such as a tribrominated product.

The amount of catalyst employed should be at least 2% by weight, based on the weight of the polystyrene reactant. Catalyst levels in the range from about 5% to about 8% are preferred. More of the catalyst may be used than 8%, such as up to about 15%, but the use of large amounts is economically unattractive. Catalyst levels lower than about 5% may result in the production of an underbrominated product, unless a large excess of bromine chloride is employed. In other words the reaction is technically feasible with very small amounts of catalyst and very large amounts of bromine chloride over that theoretically required, or at the other end of the scale, with large amounts of catalyst and very little excess of bromine chloride over that theoretically required, but such conditions, while technically feasible, are not economically attractive under present conditions.

The catalyst used is a Lewis acid catalyst, or preferably, a metal halide Lewis acid catalyst that is capable of effecting a Friedel-Crafts reaction. The preferred catalysts include the bromides and chlorides of aluminum, antimony, and mixtures thereof. Specific examples of suitable metal halide Lewis acid catalysts include $SbCl_3$, $SbCl_5$, $SbBr_3$, $SbClBr_4$, $SbBrCl_4$, $FeCl_3$, $FeBr_3$, $AlCl_3$, $TiCl_4$, $TBr_4$, $SnCl_2$, $SnCl_4$, $AlBr_3$, $BeCl_2$, $CdCl_2$, $ZnCl_2$, $BF_3$, $BCl_3$, $BBr_3$, $BiCl_3$, and $ZrCl_4$, and mixtures thereof. This list is intended to be exemplary rather than exhaustive.

The Lewis acid catalysts exhibit different levels of activity. Moisture, methanol, and other materials that dissociate or complex with the catalyst affect the level of activity of any given catalyst. For example, less than 5% of the catalyst $SbCl_3$ can be used to achieve tribromination if the system is essentially dry. An "essentially dry" or "substantially anhydrous" system or reaction mixture is one in which all of the solvent employed has been azeotropically distilled to remove water. Typically this produces a moisture content of 0.02% or less based an ethylene dichloride solvent. Other components are purchased or made up to be as dry as feasible. Comparable bromination results could be obtained only with the use of much more catalyst if higher levels of moisture were present.

In practice, anhydrous conditions are an ideal and are difficult to attain. Thus the catalyst is ordinarily essentially (but not completely) anhydrous, as purchased commercially. It is usually packaged to keep the catalyst free from contact with moisture, and any catalyst in an opened package is stored under dry conditions. Nevertheless, preferably each lot of catalyst is azeotropically dried before use, by rinsing the catalyst with a suitable solvent, then heating to drive off the azeotrope and any excess solvent.

It has been observed that a moisture content of 0.03% of the solvent destroys about half of the activity of the catalyst when the catalyst is present in the amount customarily used in a substantially anhydrous system, and this amount, 0.03% moisture, is considered the limit that can be present for a practicable process.

The organic solvent that is selected as the reaction medium should dissolve the reactants and be inert or of very low reactivity toward them. Organic solvents that are free of carbon-to-carbon unsaturation have been found to be suitable. Especially suitable are those halogenated, particularly chlorinated, aliphatic hydrocarbons that are saturated. Carbon saturation in the solvent is needed primarily to resist halogenation. Suitable solvents include carbon tetrachloride, chloroform, tetrachloroethane, methylene chloride, trichloroethane, dibromoethane, and the like. The preferred solvent is ethylene dichloride. Other preferred solvents are 1,1,2,2-tetrachloroethane, methylene dichloride and 1,1,2-trichloroethane. If methylene chloride is employed, the proper equipment should be employed to contain it, because it tends to escape because of its volatility.

The solvent should be substantially anhydrous, since water may destroy or deactivate the catalyst. Ordinarily commercial grades of solvent are used. Generally the manufacturer specifies a maximum moisture level, and for present purposes, the use of commercial solvents has been found to be satisfactory. However, it is a wise precaution to ascertain the moisture level and/or heat the solvent to dry it. The small amount of moisture normally present in commercially available halogenated hydrocarbon solvents does moderate the activity of the catalyst, however, so that in some cases, more or less catalyst may be required for a given result, depending upon the total amount of moisture present. Water exerts its greatest observable effect when the catalyst is a strong catalyst, and exerts the least observable effect when the catalyst is a weak catalyst. This effect of water is well recognized, as in Olah, Friedel-Crafts an Related Reactions, Interscience Publishers, 1963, pp. 294–6. The same effect is also recognized as extending to other materials that form complexes with the catalyst, such as alcohols, see Ohal, op. cit., p. 291. While Olah tends to speak in terms of catalyst purity (with respect to the presence of water, an alcohol, and the like), the effect is the same whether the activity-moderating material is present in the catalyst or is derived from something else in the reaction system, such as the solvent.

Generally a maximum amount of about 0.005% of $H_2O$ based on solvent is a desirable specification, although it is neither possible nor advisable to set any one maximum figure because the effect of moisture depends on the activity of the catalyst, and within limits any adverse effect can usually be compensated for by the addition of more catalyst. The preferred solvent for the preferred mode of practice of the invention is ethylene dichloride, and the preferred catalyst is antimony trichloride. With this combination, a maximum moisture specification for the ethylene dichloride, as purchased, of 0.02%, has been found to be satisfactory.

The polystyrene reactant that is selected for bromination, according to the preferred embodiment, to produce an essentially tribrominated product that is useful as a flame retardant additive, should have a molecular weight of at least 100,000, and preferably, 150,000. Much higher molecular weights, up to about 750,000, can be used. For practical handling reasons, an upper limit of 250,000 is preferred.

The process is also effective for the bromination of substituted polystyrene, the substitution being along the alkylene chain of the polystyrene, or nuclear. Obviously, nuclear substituents may affect the position(s) at which the bromination occurs, either by occupying some otherwise available positions, or by reason of a directing influence. Among the substituted polystyrenes that may be brominated in accordance with the process of the invention are, by way of example:

poly-(monobromostyrene)
poly-(monchlorostyrene)
poly-(dichlorostyrene)
poly-(monochloro-monobromo-styrene)
poly-(2-methyl styrene)
poly-(alpha-methyl styrene)
poly-(mono-lower alkyl styrene)

From conducting many demonstrations of the preferred process of the invention, it has been observed that higher reaction temperatures tend to result in a decrease in the molecular weight of the brominated product, and for some purposes more importantly, may lead to a product that evinces color. Thus when the reaction is carried on at a temperature in the range from about 33° C. or so to about 50° C., a tribrominated polystyrene product tends to have more color, than when a temperature of 33° C. or less is used; products produced at temperatures below about 33° C. have higher whiteness values. Lower reaction temperatures result in slower rates of reaction, however, with the possibility of consequent lower degrees of bromination. For best results in terms of fast reaction rate and the production of a white tribrominated polystyrene product free from color, the reaction temperature may be maintained in the range from about 20° C. to about 33° C., when the reactants employed are polystyrene having a molecular weight above about 150,000, and the other reactants are those illustrated in the equation above.

Any unreacted bromine chloride may be removed by simple distillation, or by chemical elimination of it, as by the addition of an aqueous solution of bisulfite or caustic.

One preferred product recovery technique involves adding the warm reaction mixture to hot methanol. This simple technique has been found to precipitate the product in highly desirable finely particulate form, with good color characteristics. In practicing this recovery technique, however, the temperature of both the polymer solution and the methanol, along with rates of stirring and addition, are very important for good results.

Simple evaporation of the solvent can be used to isolate the brominated polystyrene. Generally, however, solvent evaporation techniques produce products that tend to have relatively poor color characteristics and a relatively high contents of volatiles.

Any brominated polystyrene product has inherent fire retardant properties, so that it may be useful per se or alternatively for blending with or adding to another material. For use as a fire retardant additive to a host polymer, it is usually desirable to use the smallest feasible amount of the additive. For this reason, generally it is preferred to produce and use as a fire retardant additive what is essentially a tribrominated polystyrene product. In the industry, it is common to adjust the amount of brominated additive employed in the plastic composition with which the additive is used, to attain a particular degree of resistance to burning. In general, the higher the bromine content of a particular additive, the greater are its flame retardant properties, and the less of that additive that must be employed. The smaller the amount of additive employed, generally speaking, the better the economics. While in some cases the use of a flame retardant additive enhances the physical characteristics of the overall composition in which the additive is incorporated, more generally, the use of an additive tends to lower the values by which desirable physical characteristics are measured, and for this reason also, lesser amounts of additives are preferred when equivalent results can be attained.

While these considerations would seem to indicate that complete bromination would be desirable, this is not usually the case. First, the difference between complete bromination and tribromination, in the brominated polystyrene product, is the difference in bromine content between 80.2% and 70.4%. Secondly, as repeated demonstrations of the invention have indicated, when the point of trihalogenation is reached in ethylene dichloride, the halogenated polystyrene appears to pass through a physical change. This change does not relate to cross-linking but rather to a change in solubility in the particular solvent that is being used. The product, as trihalogenation (approximately 69% Br) approaches and is achieved in ethylene dichloride, tends to form a thick, gummy material that drops out of solution and that is extremely difficult to process further and to recover. In the solvent, methylene dichloride, this point seems to be reached at about 65% Br. For these reasons among others, the preferred process of the invention is ordinarily practiced to produce a trihalogenated polystyrene product, that is, an essentially tribrominated polystyrene product.

The invention will now be further described in detail by descriptions of specific demonstrations thereof. In the following examples and throughout this application, all parts and percentages are by weight and all temperatures are expressed in degrees Celsius, unless expressly stated to be otherwise. Also, unless otherwise identified, the polystyrene was Dow Chemical's Styron 678U product. This has a weight average molecular weight (GPC) of about 150,000. The ethylene dichloride employed was one with a manufacturer's specified maximum moisture content of 0.02%, but in most pilot plant demonstrations of the invention, it was heated to dry it.

EXAMPLE 1

Laboratory Demonstration of the Process; 23% Excess BrCl

A solution was prepared by placing in a 500 ml. resin kettle 219.3 g. of ethylene dichloride and 16.7 g. of polystyrene, and heating to 68° C. while stirring. The solution was then permitted to cool to about 50° C., and 0.83 g. of antimony trichloride was added, with stirring until the antimony trichloride was completely dissolved.

A solution of bromine chloride was prepared by adding elemental bromine to ethylene dichloride in a reaction flask, cooling, then adding chlorine. As used, the bromine chloride solution contained about 52.4% of ethylene dichloride, 32.8% of bromine and 14.8% of chlorine. This solution was added to the polystyrene solution in increments over a period of about 3 hours. A total of 152.3 g. of the bromine chloride solution was added while maintaining the temperature of the contents of the resin kettle at about 50° C.

After all of the bromine chloride had been added, the stirring was continued for about 2 hours while the temperature was maintained at about 50° C. At that time, heat was applied to raise the temperature sufficiently high to distill off the volatiles. Distillation began at about 81° C., and about 264 ml. of ethylene dichloride were collected over a period of about 40 minutes. This was replaced with fresh ethylene dichloride in an amount of about 250 ml., then an additional amount of 260 ml. of fresh ethylene dichloride was added, to produce a final volume of 545 ml., representing a solution concentration of about 10% by weight.

This solution was then transferred to a heated dropping funnel at about 82° C., and the solution was dropped rapidly into 619 ml. of a refluxing azeotrope of isopropyl alcohol and water. The azeotrope contained 87.8% of the alcohol and 12.2% of the water.

The contents of the flask were then cooled to room temperature, filtered, and washed twice with 100 ml. of the alcohol-water azeotrope. The product was then dried overnight at 105° C. The yield was 50.6 g. of a halogenated polystyrene product.

During the reaction, the polystyrene was reacted with an approximately 23% excess of bromine chloride over that required to produce a tribrominated product. The final yield after reheating the initial product was 49.6 g., amounting to 91% by weight of theoretical. The product analyzed 67.5% bromine, 0.69% chlorine, and on a second analysis, analyzed 67.35% bromine, 0.62% chlorine, and 0.59% antimony. The product was essentially a tribrominated polystyrene. The percent volatiles after 1 hour was 0.384%; after two hours 0.558%; and after three hours 0.957%.

Upon thermogravimetric analysis, the following results were observed:

| | |
|---|---|
| $T_1$ | 321° C. |
| $T_{10}$ | 364° C. |
| $T_{50}$ | 402° C. |

The residue left at 450° C. was about 19% of the original by weight.

One of the economic problems with a process such as this is recovery and reuse of the solvent. In an exploration of the possibility of recycling the solvent in this process, the process just described was essentially repeated, the major change being the use of 0.84 g. of antimony trichloride, the other amounts being the same and the process parameters being essentially the same. After completion of the addition of the bromine chloride solution, and the allowance of an additional two hours for the reaction to go to completion, the reaction mixture was heated to distill off the unreacted bromine chloride and the ethylene dichloride solvent, until the distillate became colorless and the volume of the reaction mixture remained constant. The reaction mixture was then diluted to form an approximately 10% solution, by the addition of fresh ethylene dichloride.

This solution was then added to a heated azeotropic solution of isopropyl alcohol and water, to precipitate the brominated polystyrene product. The product was filtered out, and then dried in an oven at 110° C. overnight. The filtrate was then distilled to recover the azeotrope of isopropyl alcohol and water. Indications were that the azeotrope could be recycled for reuse.

EXAMPLE 2

Use of a 5% Excess of Bromine Chloride in the Process

In this example, the amount of bromine chloride was sufficient to provide an approximately 5% excess over the theoretical amount required for tribromination.

For this reaction, a bromine chloride solution was prepared by charging to a reactor 80.0 lbs. of ethylene dichloride and 40.4 lbs. of bromine. After chilling the mixture to reduce the temperature, 18.2 lbs. of chlorine was added slowly, and permitted to react.

In a separate vessel, a solution of polystyrene was made by mixing together 219.5 lbs. of ethylene dichloride, 16.7 lbs. of polystyrene, and, after dissolution of the polystyrene, 14 oz. of antimony trichloride. This solution was maintained under a nitrogen atmosphere, then the bromine chloride solution was gradually added, with agitation, while maintaining the temperature in the range from about 117° F.-127° F. (47° C.-53° C.).

During the addition of the bromine chloride, the reaction mixture had a clear, reddish-brown color. The addition of the bromine chloride was completed over about 3 hours. The reaction mixture was then held within the previously stated temperature range for an additional period of about 2 hours, with stirring, the reaction mixture remaining clear but colored. At the end of the two hour hold interval, the bromine chloride supply tank was flushed with an additional 30 lbs. of ethylene dichloride, which was then transferred into the reaction vessel.

After an additional hour or so, a solution of sodium hydroxide was made up in a scrubber, by mixing together 4.0 lbs. of flake caustic soda and 36.0 lbs. of water. The reaction mixture was then heated to distill off excess bromine chloride and some ethylene dichloride. For each 2.5 gallons of ethylene dichloride-bromine chloride solution that was distilled off and passed into the scrubber, fresh, make-up ethylene dichloride was added back to the batch, in the amount of about 26 lbs. The condensate in the scrubber attained a volume of about 30.0 gallons, at which time 260.0 lbs. of fresh, make-up ethylene dichloride had been added back to the reaction mixture. At this point, it appeared that not all of the bromine chloride had been neutralized by the caustic, and an additional 34 lbs. of water and 6 lbs. of flake caustic were added to the scrubber and mixed with the material already present. After mixing, 235 lbs. of ethylene dichloride were drained out.

An additional 140 lbs. of fresh ethylene dichloride was added to the reaction mixture, to make up an approximately 10% solution of the polybrominated product. The product was precipitated from solution with isopropyl alcohol. It analyzed at 67.6% bromine and 0.8% chlorine.

EXAMPLE 3

Precipitation with Methanol; Chemical Destruction of Bromine Chloride

To insure substantially anhydrous conditions, the three vessels to be used were boiled out with methanol, then dried. Interconnecting lines were flushed with methanol, and drained.

In a first reactor, 80 lbs. of ethylene dichloride was mixed with 41.4 lbs. of bromine. 18.6 lbs. of chlorine were then added over a period of about 1 hour, to form a bromine chloride solution.

At the same time, 219.5 lbs. of ethylene dichloride and 16.7 lbs. of polystyrene were placed in a second reactor and heated to a temperature in the range from about 122° F.-149° F. (50° C.-65° C.), to cause the polystyrene to dissolve. At that time 14 oz. of antimony trichloride was added to the polystyrene solution, and mixed thoroughly.

The bromine chloride solution was then transferred over a 3 hour period into the polystyrene solution, while maintaining the temperature in the range from about 117° F. to 127° F. (47° C.-53° C.). When the transfer had been completed, the reaction was permitted to continue for about 3 hours, while the temperature was maintained in the same range.

A mixture was made of 8 lbs. of sodium bisulfite in 59.0 lbs. of water. This 12% solution of sodium bisulfite was then added slowly to the reaction mixture, to neutralize unreacted excess bromine. The addition took place over a period of about 10 minutes, after which mixing was continued for another 10 minutes. The temperature rose to about 135° F. (57° C.) before dropping back to 125° F. (52° C.). After allowing a few minutes for equilibration, agitation was stopped, and the reaction mixture was allowed to separate into two layers. The reaction vessel was then placed under an atmosphere of nitrogen under slight pressure.

The heavier, lower product layer was then transferred gradually into a heated reactor containing 300.0 lbs. of methanol at reflux temperature, over a period of about 1 hour. The product layer that separated out was a straw yellow in color. The initial methanol reflux temperature of 149° F. (65° C.) dropped gradually down over a period of about 1 hour to about 139° F. (59° C.). At this time cooling was commenced, to cool the contents of the reactor to about 80° F. (27° C.).

The product was in the form of relatively large particles that had a tendency to adhere to each other and to the reactor, and had to be removed from the reactor manually. When filtered, the cake was washed twice with 20 lbs. of methanol each time. The product was then dried on a rotary vacuum dryer at 200° F. at full vacuum.

The batch of product was considered to be dry after 48 hours. The theoretical yield for a tribrominated polystyrene product would have been 54.7 lbs. The actual yield of product solids was 44.0 lbs. (80.4% based on an expected 54.7 lbs). The product had the following analysis:

| Bromine | 68.94% |
| Chlorine | 0.86% |
| Volatiles | 0.28% |
| Antimony | 0.11% |
| Iron | 89 ppm |

The values reported above for the metals are averages of two separate analyses. The color of the product on the Gardner scale was as follows:

| L | 87.1 |
| a | 1.4 |
| b | 11.05 |

The product analyzed to be slightly more than trihalogenated. This is believed to account for the difficulty in handling the product and recovering it in convenient form, that is, in the form of dry, free-flowing, very fine particles.

EXAMPLE 4

Use of 10% Excess Bromine Chloride, With Methanol Precipitation

A bromine chloride solution was made up in a reactor by placing in the reactor 80 lbs. of ethylene dichloride and 42.4 lbs. of bromine. Over a period of about 2 hours, 19.0 lbs. of chlorine were gradually added to the reactor in conventional fashion, initially under vacuum, and after about an hour, under pressure. The reactor was cooled during the reaction. The pressure in the reactor was maintained with nitrogen, initially at about 1.5 psi, and slowly building up to about 4.0 psi.

Separately, 16.7 lbs. of polystyrene were dissolved in 219.5 lbs. of ethylene dichloride, using heating to about 50° C., and agitation. When the polystyrene had dissolved, 14 oz. of antimony trichloride was added and dissolved.

The bromine chloride solution was then added to the polystyrene solution over a three hour period, with the temperature being maintained in the range from about 117° F. to 127° F. (47° C.–53° C.). During the reaction, the batch had a clear, reddish-brown color, and despite cooling, the reaction generated enough heat to cause the batch to reflux. The bromine chloride tank was flushed out with 30 lbs. of ethylene dichloride, which was added to the reactor. The batch was then held in the same temperature range for about 2½ hours, to permit the reaction to go to completion.

An overhead scrubber was charged with a solution of 8 lbs. of flake sodium hydroxide and 72 lbs. of water. The batch of reaction product was then heated to about 50° C., to distill off unreacted bromine chloride. For every 2.5 gallons of ethylene dichloride—bromine chloride distilled off, 26 lbs. of fresh, make-up ethylene dichloride was added to the batch. The distillation was continued over a period of about 2 hours at a temperature of about 180° F. (82° C.). During this time it was necessary to add a total of 360.0 lbs. of fresh, make-up ethylene dichloride to the reaction mixture, to replace material distilled off.

When all of the bromine chloride appeared to have been removed, another 162 lbs. of ethylene dichloride were added to the reaction mixture to produce an approximately 10% solution. 543.5 lbs. of the solution was produced in this fashion. At this point, the product analyzed at 68.41% bromine and 0.70% chlorine.

The product was precipitated in methanol, washed with methanol, and dried. Two different samples, identified as Samples 4a and 4b respectively, were subjected to analysis. The results were as follows:

| Component | Sample 4a | Sample 4b |
| --- | --- | --- |
| Bromine | 67.05% | 67.54% |
| Bromine (2nd analysis) | 67.04% | 67.59% |
| Chlorine | 1.53% | 1.14% |
| Chlorine (2nd analysis) | 1.53% | 1.16% |

This product appears to be very close to a trihalogenated product.

EXAMPLE 5

Recovery of an Approximately Dihalogenated Product; Effect of Moisture

A halogenation was carried out with bromine chloride following generally the preferred process of the invention. However, there apparently was some water present in excess of 0.02% of solvent during the reaction, as the end product had a lower bromine content than initially intended and expected.

To recover the product, 400 g. of the product solution, containing approximately 15% by weight of the halogenated high molecular weight polystyrene in ethylene dichloride, was diluted further by the addition of 200 g. of ethylene dichloride to reduce the concentration of the solution to about 10%. The solution was then heated to about 80° C., and introduced drop-wise into 1,200 ml. of boiling methanol over a 35 minute period. The halogenated product precipitated in the methanol.

The resulting material was cooled, then washed twice with 100 ml. of methanol each time, then dried overnight at 115° C.

The yield was 43.4 g. of particulate product. Analyses of two separate samples indicated that the first sample contained 62.63% bromine and 0.73% chlorine, whereas the second sample contained 62.63% bromine and 0.51% chlorine.

These analyses indicate that the product was approximately dibrominated. Theoretically, a dibrominated polystyrene product, containing no chlorine, would contain about 61% bromine by weight.

EXAMPLE 6

Use of 1-Butanol as a Precipitant

A 10% solution in ethylene dichloride of an approximately trihalogenated high molecular weight polystyrene was prepared, utilizing essentially the process and proportions employed in Example 1. The product solution was added dropwise to a bath of 1-butanol that was maintained at a temperature of approximately 93° C.

The rate of addition of the product solution to the butanol bath was adjusted so that the amount of ethylene dichloride present was such that lumps of polymer would not be formed. The addition took approximately one hour, during which time the temperature of the bath was maintained in the range from about 95° C. to about 100° C. As the product solution was added, solvent was distilled off and condensed. The condensate had a composition of approximately 78% ethylene dichloride and 22% n-butanol, by weight. The liquid residue in the flask consisted of approximately 7% by weight of ethylene dichloride and 93% by weight of n-butanol.

After filtering the precipitated product, washing twice with n-butanol, and drying at 120° C. overnight, the precipitate was found to contain 68.78% bromine, no apparent chlorine, and 0.09% antimony.

EXAMPLE 7

Recovery of a Tribrominated High Molecular Weight Polystyrene Product With Methanol Essentially the proportions of reactants and the procedure of Example 1 were used. That is, the polystyrene solution in ethylene dichloride was maintained at a temperature in the range from about 50° C. to about 54° C. over a period of a few hours, during which the bromine chloride solution was gradually added to the polystyrene solution.

After a hold period to permit the reaction to go to completion, the solution of the reaction mixture was slowly added to 619 ml. of boiling methanol over a 45 minute period. The product precipitated as a very fine powder. During the precipitation, a nitrogen purge was employed to prevent any accumulation on the addition funnel.

Approximately 49.0 g. of precipitated product, wet with ethylene dichloride solvent, was washed twice with methanol.

After drying, a first sample analyzed to contain bromine, 67.68%; chlorine, 0.68%; and antimony, 0.15%. A second sample analyzed to contain 67.88% bromine and 0.49% chlorine. These analyses indicated that the halogenation of the polystyrene closely approached trihalogenation.

Upon thermogravimetric analysis, weight loss started at 340° C. A 1% loss was observed at 396° C., a 10% loss at 427° C., a 50% loss at 487° C., and 100% of the material was lost at 750° C. The properties observed indicated that the product would make an excellent flame retardant additive.

EXAMPLE 8

Bromination to a Level of about 1 Bromine For Every Two Styrene Units

The amount of bromine chloride solution employed was approximately a 20% by weight excess of that amount required to introduce one bromine for every two rings in the polystyrene molecule, on the average.

A polystyrene solution was prepared from 33.4 g. of Styron 678U polystyrene and 250 ml. of ethylene dichloride, by heating until complete dissolution was observed. At that time, 1.67 g. of antimony trichloride was added. 43.4 g. of bromine chloride solution was slowly added to the polystyrene solution over a period of about 2 hours. During the addition, the temperature was maintained in the range from about 22° C. to about 26° C. After the addition had been completed, the reaction mixture was stirred and the temperature was maintained at about 22° C. for about an hour, to permit the reaction to go to completion. A 10% aqueous solution of sodium hydroxide was then added to destroy the unreacted bromine chloride. The reaction mixture was then extracted twice with distilled water.

The reaction product was diluted to 500 ml. by adding ethylene dichloride, and then added slowly to 2.5 liters of methanol at reflux temperature. A fine, somewhat fibrous precipitate was filtered, then dried overnight, first in a hood, and then for 24 hours in a vacuum oven at 50° C. The yield was 42.7 g. of a brominated polystyrene product.

A first sample of the product analyzed at 27.31% bromine and 1.01% chlorine. A second sample analyzed at 27.53% bromine and 0.85% chlorine. A product containing 1 bromine atom on every second ring of the initial polystyrene reactant (an average of 0.5 bromines per ring) would contain 27.9% Br, theoretically. Accordingly, the product appeared to be very close to that desired.

EXAMPLE 9

Production of an Essentially Tribrominated Polystyrene; Recovery in Methanol A reaction flask was charged with 350 ml. of ethylene dichloride (EDC), and then 33.1 gms. of Dow's Styron 678U polystyrene was added. The flask was heated to about 70° C. to cause the polystyrene to dissolve. Then 1.66 gms. of $SbCl_3$ was added, and went into solution. The solution was then cooled to about 50° C.

A solution of bromine chloride, in the amount of 304.5 gms., containing 144.9 gms. BrCl dissolved in 159.6 gms. of EDC, was slowly added to the solution in the flask with stirring, over 185 minutes, at 47° C.–52° C. This was a 30% excess over the amount theoretically required for the tribromination of the polystyrene. After completion of the addition, the reaction mixture was stirred for an additional two hours. Then the unreacted bromine chloride was distilled off. Some EDC distilled off as well, and fresh EDC was added to the flask to maintain the volume constant.

A total of about 355 ml. of ethylene dichloride was added for this purpose. At reflux temperature, the solution in the flask was clear.

After completion of the distillation for the removal of bromine chloride, the solution in the flask was slowly cooled to about 50° C., at which temperature it became cloudy.

In a separate flask, 540 ml. of methanol was heated to 60° C., with constant stirring at a high rate. The reaction mixture was then slowly added to the methanol, while the temperature of the methanol was maintained at about 60° C. As the reaction mixture was added, the halogenated polystyrene precipitated out as a fine powder. After all of the reaction product had been added to the methanol, the powder was collected by filtration at 40° C. The powder was washed twice, each time at about 125 ml. of methanol. The methanol used for the washing was discarded. The powdered product was placed in an oven at 75° C. to dry over a weekend.

The dried product weighed 102.6 g. An analysis of the product indicated that it had a bromine content of 70.16% a chlorine content of 0.40%; and an antimony content of 0.14%. The analysis of the product indicated that the degree of halogenation had gone beyond the trihalogenation stage to a minor extent.

This was considered to be a satisfactory demonstration of the preferred process of the invention. The product appeared to be one that would be useful as a flame retardant additive for other synthetic resin materials.

EXAMPLE 10

Demonstration of the Process on a Polystyrene of Intermediate Molecular Weight, Laboratory Scale A quantity of 350 ml. of tetrachloroethane was placed in a reaction flask. 33.1 g. of Polyscience polystyrene beads (lot no. 20 D) was added. This polystyrene is believed to have had a molecular weight of about 50,000. The contents of the flask were then heated to about 70° C. to dissolve the polystyrene beads.

The polystyrene solution was then slowly cooled to about room temperature. At this temperature, the solution was viscous. The catalyst, 1.65 g. of antimony trichloride, was then added. It dissolved in about 20 minutes.

A previously prepared solution of 334.1 g. of bromine chloride was then added over the next 105 minutes. The bromine chloride solution contained 28.8% by weight of bromine, 13.0% by weight of chlorine, and 58.2% by weight of tetrachloroethane (about 125 ml.) The amount of bromine chloride was in excess of 30% over the theoretical amount required to produce a tribrominated product. The amount of catalyst was approximately 5% by weight based on the polystyrene.

As the bromine chloride was added, the reaction mixture was continuously stirred and cooled, and the reaction temperature was not permitted to rise above 37° C. After completion of the addition of the bromine chloride, the reaction mixture was left to stand overnight at room temperature.

Thereafter, the unreacted, excess bromine chloride was distilled off from the reaction mixture, together with tetrachloroethane. After removal of the unreacted bromine chloride was essentially complete, the reaction mixture was cooled to room temperature. The tetrachloroethane was then removed by steam distillation.

The removal of the tetrachloroethane left behind a thick slurry that was filtered. The filter cake was washed with water, then placed in a 60° C. oven to dry, and 22.1 g. of dried product was recovered.

The remainder of the thick slurry (378 ml. of the original 463 ml.) was caused to precipitate out by adding it slowly to a mixture of methanol and isopropyl alcohol, at reflux temperature. The precipitate was separated by filtration, washed twice with isopropanol, then dried at 60° C. in an oven. In this way, 88.3 g. of product was recovered.

The dried product obtained by precipitation in the alkanol mixture had superior color characteristics as compared to the first dried reaction product.

The alkanol precipitated product had an approximate analysis of 67.3% bromine by weight, and 2.6% chlorine by weight (both averaged from 3 samples).

EXAMPLE 11

Further Laboratory Scale Demonstration of the Process: Tribrominated Product; Recovery in Isopropanol A solution of bromine chloride is prepared by charging into a reaction flask 79.8 g. of ethylene dichloride and 50.0 g. (0.31 moles) of bromine. The resulting mixture is cooled to a temperature in the range from 0° C. to 5° C. Using a gas sparger, 22.5 g. (0.32 moles) of chlorine gas is then added to the flask.

In a separate vessel equipped with a mechanical stirrer, 16.7 g. (0.16 moles) of polystyrene, having a molecular weight of 100,000 to 200,000, is dissolved in 219.3 g. of ethylene dichloride, together with 0.83 g. (0.004 moles) of antimony trichloride.

The chilled solution of bromine chloride is then gradually added to the solution of polystyrene and catalyst over a period of about 3 hours, with stirring, while maintaining the temperature in the range from 27° C. to 33° C. At the completion of the addition of the bromine chloride, the reaction mixture is stirred for an additional period of 3 hours, while maintaining the temperature in the range from 27° C. to 33° C.

At this time the reaction is deemed to be complete. A sufficient amount of aqueous 12.5% solution of sodium hydroxide is then added to destroy any remaining bromine chloride. After a few minutes of stirring, the use of the mixer is discontinued and phase separation occurs.

After the phase separation, the aqueous phase is removed and discarded. The solution of product in ethylene dichloride is diluted to 10% by the addition of more of this solvent. The product is then precipitated by adding the product slowly to 619 mls. of refluxing isopropanol, to form fine particles of the halogenated polymer. The fine particles are separated by filtration, washed with additional isopropyl alcohol, and dried in a forced air oven at 115° C.

The product is a typical trihalogenated polystyrene product of this invention, with a bromine content of about 67.6% by weight, a chlorine content of about 1.6% by weight, and about 0.6% by weight of volatiles. The yield of product, calculated from the equation above, and based upon a tribrominated polystyrene product, is about 90%. The particles have a highly desirable white color.

When the weight average molecular weight of the initial polystyrene as determined by gel permeation chromatography is about 150,000, the weight average molecular weight of the product, as determined by light scattering, is about 113,000, indicating that there is chain scission during the process.

EXAMPLE 12

Practice of the Preferred Process on a Pilot Plant Scale

A glass reactor of 75 gallons capacity is charged with 320 lbs. of ethylene dichloride, and 16.7 lbs. of polystyrene (molecular weight about 150,000).

This mixture is heated to reflux temperature to dissolve the polystyrene and to remove any water present in the solution by distillation of 5% to 10% by volume of the solvent. The ethylene dichloride is continuously recycled back to the reactor. The azeotropic mixture that distills off contains 91.8% ethylene dichloride and 8.2% water, whereas the solubility of water in ethylene dichloride is only about 0.2% at room temperature.

The solution is then cooled to about 90° F. (32.2° C.), and 600 g. of dry antimony trichloride is added to the reactor. While stirring is continued, 60 lbs. of bromine chloride solution is slowly added to the reactor over a three hour period, while maintaining a temperature in the range from about 88° F. (31.1° C.) to about 92° F. (33.3° C.), and preferably, as close to 90° F. (32.2° C.) as feasible. Since the reaction is exothermic, cooling is required. The effluent hydrogen chloride is trapped in a scrubber containing sodium hydroxide solution.

The amount of bromine chloride solution employed is an 8.3% excess over what is required, theoretically, to produce a tribrominated product at 70.3% bromine content. After the addition is completed, the reaction mixture is permitted to remain in the reactor, with stirring, for about three hours, while the temperature is maintained at about 90° F. (32.2° C.). At the end of that time, 120 lbs. of a solution of sodium hydroxide at 5% concentration in water is added to destroy the excess, unreacted bromine chloride, and neutralize by-products HCl. After mixing for 15 minutes, the reaction mixture is allowed to settle for about 30 minutes. The water layer, containing unreacted caustic, is then separated from the organic solvent layer.

The solution of product remaining in the reactor is then heated to a temperature in the range from about 150° F. to about 160° F. (65.5° C. to 71.1° C.). In a separate 300 gallon reactor, methanol is maintained essentially at the boiling point, with maximum agitation. The heated reaction product is then added slowly to the reactor by injection beneath the surface of the methanol. The product precipitates in the form of fine particles, remaining as a slurry in the reactor after the addition has been completed.

The product slurry is filtered and the product dried in a vacuum dryer at 200° F. (93.3° C.) under vacuum. This produces 54.7 lbs. of product.

In a typical pilot plant run, following the procedure described above, the weight average molecular weight of the trihalogenated product, as determined by light scattering, is in the range from about 135,000 to about 137,000. This molecular weight value also indicates that some chain scission occurs.

| Typical properties are: | |
|---|---|
| Bromine content | 67.5% |
| Chlorine content | 1% |
| Softening point (DSC)[1] | 220° C. |
| Specific gravity[2] | 2.8 |
| Percent volatiles[3] | 0.25% |
| Volatility, TGA[4] | |
| Initial loss | 230° C. |
| 1% loss | 340° C. |
| 10% loss | 408° C. |
| 50% loss | 435° C. |
| Color Gardner | |
| L | 93.5 |
| a | 0.0 |

| Typical properties are: | |
|---|---|
| b | 9.0 |

[1] Differential scanning calorimetry 20° C./min.
[2] Helium air Pyconometer.
[3] Thermogravimetric analysis 1 hr. at 245° C.
[4] Thermogravimetric analysis (40° C./min.).

General Comments on the Preferred Process and Product

In the point obtained from any practice of the preferred process of the invention, some chlorine invariably substitutes in the polystyrene as well as bromine. When an atom of chlorine substitutes on a ring rather than bromine, there is the same degree of halogenation as though the substituent were bromine, but the percentage by weight of total halogen in the halogenated polystyrene drops, because the weight per atom of chlorine is about one-half the weight per atom of bromine. Accordingly, if, in 100 repeating units of halogenated styrene units in a nominally trihalogenated polystyrene, there are 10 chlorine atoms and 290 bromine atoms, the percentage by weight of bromine is 68.9% and of chlorine 1.1%; if there are 20 chlorine atoms and 280 bromine atoms, the bromine percentage is 67.4%, and the chlorine percentage is 2.1%.

One way to represent a typical trihalogenated product of the preferred process of the invention is as containing about 88% by weight of tribrominated styrene units, and about 12% by weight of dibromo-monochloro-styrene units, copolymerized in random fashion. Pilot plant trihalogenated products typically contain 67.2%–67.8% bromine and 0.8%–1.5% chlorine by weight.

When producing nominally tribrominated polystyrene by the present preferred process, the reaction is carried out until the degree of halogenation of the product approaches the trihalogenated stage. At and above the trihalogenated stage, product recovery is more difficult with most common halogenated hydrocarbon solvents; instead of remaining in solution from which it can be recovered easily upon the addition to an alkanol, the product tends to separate from the solution as a heavy, thick, oily substance, which is extremely difficult to process further. Nevertheless, products having a higher degree of halogenation can be produced and are useful, for example as fire retardant additives.

When the bromine content of a nominally tribrominated polystyrene product is in the range from about 67.5% to about 68.5%, the product corresponds substantially to a trihalognated product, because of the small amount of nuclear-bound chlorine that is present.

The polymeric nature of a tribrominated high molecular weight polystyrene product, i.e., one having a weight average molecular weight, as determined by light scattering, above 100,000, imparts excellent migration or blooming resistance, when used as a fire-retardant additive, in many plastics. With its high aromatic bromine content, such a product has excellent heat resistance, and also, good toxicological properties. When incorporating it into plastics, it is important to maximize dispersion, as with other additives, not only to realize maximum flame retardancy, but also to minimize the effects on physical properties of undispersed particles. Dispersion has been achieved successfully by two-roll milling and by extrusion, but other commercial methods would also be effective, such as, for example, the use of an intensive mixer such as a Banbury. The finely divided form of the product tends to facilitate dispersion when the processing temperature or conditions do not permit melting or flowing of the additive.

The following is a summary of molecular weight determinations for two initial commercial polystyrene reactants and for three representative high molecular weight trihalogenated polystyrene product samples produced from these reactants, as determined by gel permeation chromatography (GPC) and light scattering techniques, respectively:

TABLE 1

| Sample No. | Initial Wt. Average M. Wt. of Polystyrene Reactant by GPC | Product |  |  |
|---|---|---|---|---|
|  |  | % Br | Source | Light Scattering Wt. Average M. Wt. |
| 1 | 180,000 | 69 | Pilot Plant | 136,000 |
| 2 | 154,000 | 67 | Pilot Plant | 136,000 |
| 3 | — | 67 | Lab | 113,000 |

As an example of the non-blooming qualities of such a product, tests in polybutylene terephthalate demonstrated only slight blooming after 100 hours at 250° F. in an air circulating oven. In contrast, similarly prepared test specimens containing decabromodiphenyl oxide, a flame retardant of major commercial use, in place of the tribrominated polystyrene product of the present invention, showed substantial blooming after only 41 hours under these test conditions. In a lower temperature test at 150° F., the specimens containing a high molecular weight tribrominated polystyrene product of the present invention did not exhibit blooming after 650 hours.

In flammability testing, a UL-94 rating of V-0 was obtained on 1/32 inch specimens of polybutylene terephthalate containing the high molecular weight tribrominated polystyrene product, at a level of addition of 4.7% by weight of antimony oxide and 14% by weight of high molecular weight tribrominated polystyrene pilot plant product.

Such a high molecular weight tribrominated polystyrene product is useful as a flame retardant additive for other engineering plastics such as polyethylene terephthalate, polyimides, polyamides, and nylons, as well as more conventional resins. It is also useful for thermosetting resins such as cross-linkable polyethylene, unsaturated polyesters, and the epoxy resins. Resistance to blooming is excellent in crosslinked polyethylene. For example, in unfilled crosslinkable polyethylene at 150° F., containing high molecular weight tribrominated polystyrene product prepared according to the present invention as a fire retardant additive, there was no blooming after over 350 hours, whereas under the same conditions, there was blooming with a decabromodiphenyl oxide additive in less than 75 hours, and with Dechlorane R Plus flame retardant additive, after 115 hours. "Dechlorane R Plus" is a trademark of Hooker Chemical Corp. for a fire retardant additive that is believed to be a highly chlorinated hydrocarbon having the formula $C_{18}H_{12}Cl_{12}$ (see Chemical Abstracts, Vol. 69, 1968, 11142y).

In unsaturated polyesters, the high molecular weight tribrominated polystyrene product of the present invention can be used effectively to boost the flame-retardancy of halogen-containing resins or of resins containing alumina trihydrate as the primary flame retardant.

The amount of the high molecular weight tribrominated polystyrene additive to be employed in a given resin system depends on the degree of flame retardance required. It is possible to achieve UL-94 ratings of V-2, V-1, or V-0 in engineering resins, thermosetting resins, ABS resins, impact polystyrene, and polyolefins, by adjusting the additive use level and the amount of antimony oxide or other synergist. The optimum levels for these materials can easily be determined for any particular resin system. Generally, when antimony oxide is used, it may be employed at the rate of 1% of antimony oxide to each 2% to 5% of the trihalogenated product of the present invention that is employed in the formulation.

While the precise amounts or ranges employed for any particular resin will depend on many factors, including the molecular weight of a particular resin, the way in which it was produced, the other additives present, and other such factors, some starting points for achieving satisfactory flame retardance with the high molecular weight essentially tribrominated polystyrene products of the present invention are suggested in Table 2 below.

TABLE 2

Suggested Levels of Use[a] for Flame Retardance

| Resin | Tribrominated Polystyrene Product, (%) | $Sb_2O_3$ (%) |
|---|---|---|
| Polybutylene terephthalate | 10–16 | 3–6 |
| Polyethylene terephthalate | 9–15 | 3–5 |
| Nylon | 10–15 | 3–5 |
| Crosslinkable Polyethylene | 25–40 | 8–14 |
| ABS | 15–20 | 4–6 |
| High Impact Polystyrene (HIPS) | 12–15 | 3–5 |
| Crystal Polystyrene | 10–16 | 3–6 |
| Unsaturated Polyester | 12–15 | 3–5 |
| Polyethylene | 25–40 | 8–14 |
| Polypropylene | 25–40 | 8–14 |
| Epoxies | 20–28 | 4–10 |

[a]Where the additive is a nominally tribrominated polystyrene produced by a process similar to that of Ex. 1 from a polystyrene of initial M. Wt. of about 150,000 (GPC). The additive specification is preferably Br. content, 67.5%.

In the preceeding paragraphs, the attractiveness, advantages, and properties of high molecular weight, essentially tribrominated polystyrene, produced in accordance with the preferred process of this invention, have been discussed. In this context, the term "high molecular weight" is employed in this application to refer to the kind of product that is produced by the practice of the process of the invention when the initial polystyrene reactant has a molecular weight, as determined by GPC, of at least 100,000, and up to about 750,000, but most preferably, in the range from about 150,000 to 200,000. The commercial polystyrene reactant employed in most of the examples, Styron 678 U, has a molecular weight as determined by GPC of approximately 150,000.

Because of scission, such a product normally has a much lower molecular weight, as determined by light scattering, than would be expected. That molecular weight is always below the molecular weight of the theoretical tribrominated polystyrene product. In fact, the molecular weight of the product is often below the molecular weight of the initial polystyrene reactant, although different methods are ordinarily employed for determining the weight average molecular weight of each.

However, the high molecular weight trihalogenated polystyrene product represents a preferred product of the invention. When the molecular weight of the initial polystyrene reactant is about 20,000 or so, that reactant might well be referred to by some as an oligomer. The trihalogenated product of such an initial oligomer reactant is similar to the higher molecular weight product, in that what is an essentially trihalogenated product appears to represent an optimum in terms of ease of recovery and good physical characteristics, together with a high percentage bromine content in the product. The substitutions appear to take place at the same locations and to the same extent. Such brominated oligomeric products, especially the essentially trihalogenated products, are useful flame retardant additives, particularly for linear polyesters such as polybutylene terephthalate, nylon molding compositions, and linear thermoplastic polyesters useful for fibers.

Similarly, the essentially trihalogenated highly brominated products obtained by the practice of the preferred process of the invention on polystyrenes having molecular weights in the range from about 20,000 to about 100,000 are also generally useful fire retardant additives. The trihalogenated products in general are preferred for ease of recovery and high bromine content.

In all cases, the halogenated polystyrene products of the present invention can be used either alone, as fire retardant additives, or in combination with other materials, such as synergists, or other halogenated organic compounds, particularly those that also have fire retardant properties.

CONCLUDING COMMENTS ON THE INVENTION

Bromine chloride is the preferred brominating agent for use in practicing the preferred mode of the invention. As compared to the use of bromine per se, bromine chloride is preferred for several reasons.

First, when elemental bromine is used as the brominating agent, hydrogen bromide is produced as a by-product. One half of the bromine is consumed in this way. Hydrogen bromide is such a valuable material that it is not economic to discard it. Accordingly, to make a process attractive, it would be necessary to recover the hydrogen bromide and try to recycle the bromine. In constrast, when bromine chloride is used as the brominating agent, hydrogen chloride is produced as a by-product, and all of the bromine is used for the purpose for which it is intended, which is that of bonding to the ring portion of the polystyrene molecule. Hydrogen chloride is relatively inexpensive and can be discarded without material adverse effect on the economics of the process, particularly as compared to a brominating process where elemental bromine is eployed as the brominating agent.

A second reason for preferring bromine chloride is that it is a much more reactive material than elemental bromine. Consequently, to produce a given result, a less active catalyst may be employed, or a more active catalyst in smaller amounts, and the reaction conditions may be less severe.

A third reason for preferring bromine chloride is closely related to the second reason, but relates to the apearance of the brominated product. The preferred practice of the invention calls for the use of antimony trichloride as the catalyst. This is a Lewis acid catalyst of moderate activity, and when used with bromine chloride, leads to brominated products of excellent color characteristics.Since a white product, free from any trace of color, is generally the most preferred color characteristic in a brominated flame retardant additive, the use of bromine chloride has this advantage also. If elemental bromine is employed, generally a stronger or more active catalyst is required to effect bromination, such as, for example, iron or iron chloride. This combination of reactants, or of a reactant and a catalyst, tends to produce a brominated product of less desirable color characteristics.

In its broad aspects, the present invention is one for brominating a polystyrene in a halogenated hydrocarbon solvent, in the presence of a Lewis acid catalyst. In the preferred process mode of the invention, the brominating agent is bromine chloride, the solvent is ethylene dichloride, and the catalyst is antimony trichloride.

The precise technique by which a halogenated product is recovered is not considered to be a part of this invention. In some cases the product will be used directly in the solution in which it was formed. Most often it will be a trihalogenated product that is precipitated from solution by the solvent-non-solvent technique that is described herein, permitting ultimate recovery of a dried, free-flowing, finely divided powder that is easily dispersed in a host plastic.

While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth, and as fall within the scope of the appended claims.

What is claimed is:

1. A process for producing an essentially trihalogenated polystyrene product useful as a flame retardant additive, comprising the following steps:
   a. dissolving polystyrene having a molecular weight in the range of from about 50,000 to about 750,000, as determined by gel permeation chromatography, in a chlorinated hydrocarbon solvent, at a concentration of from about 5% to about 15% by weight of said polystyrene based on said solvent;
   b. reacting said polystyrene in said solution with a stoichiometric excess of bromine chloride to produce a tribrominated polystyrene product, under substantially anhydrous conditions at less than 0.02% by weight of $H_2O$, based on said solvent, and at a temperature in the range of from about 20° C. to about 50° C., in the presence of a catalytic amount of a Lewis acid of a metal chloride salt having a Lewis acid catalyst artivity substantially equivalent to that of antimony trichloride for a sufficient period of time to permit the reaction to produce a tribrominated polystyrene product.

2. The process of claim 1 wherein the Lewis acid catalyst is antimony trichloride.

3. A process for producing an essentially trihalogenated polystyrene product useful as a flame retardant additive, comprising the following steps:
   a. dissolving polystyrene having a molecular weight in the range of from about 50,000 to about 250,000, as determined by gel permeation chromatography, in a chlorinated hydrocarbon solvent, at a concentration of from about 5% to about 15% by weight of said polystyrene based on said solvent;
   b. reacting said polystyrene in said solution with a stoichiometric excess of bromine chloride to produce a tribrominated polystyrene product, under substantially anhydrous conditions at less than 0.02% by weight of H₂O, based on said solvent, and at a temperature in the range of from about 20° C. to about 50° C., in the presence of at least 5% by weight, based on the polystyrene, of a Lewis acid catalyst of a metal chloride salt having a Lewis acid catalyst artivity substantially equivalent to that of antimony trichloride for a sufficient period of time to permit the reaction to produce a tribrominated polystyrene product.

4. The process of claim 3 wherein the Lewis acid catalyst is antimony trichloride.

5. A process for producing an essentially trihalogenated polystyrene product useful as a flame retardant additive, comprising the following steps:
   a. dissolving polystyrene having a molecular weight in the range of from about 50,000 to about 250,000, as determined by gel permeation chromatography, in a chlorinated hydrocarbon solvent, at a concentration of from about 5% to about 15% by weight of said polystyrene based on said solvent;
   b. reacting said polystyrene in said solution with a stoichiometric excess of bromine chloride to product a tribrominated polystyrene product, under substantially anhydrous conditions at less than 0.02% by weight of H₂O, based on said solvent, and at a temperature in the range from about 20° C. to about 50° C., in the presence of from about 5% to about 8% by weight, based on the polystyrene, of a Lewis acid catalyst of a metal chloride salt having a Lewis acid catalyst artivity substantially equivalent to that of antimony trichloride for a sufficient period of time to permit the reaction to produce a tribrominated polystyrene product containing at least 65% by weight of bromine.

6. The process of claim 5 wherein the Lewis acid catalyst is antimony trichloride.

* * * * *